(12) United States Patent
Trionfetti

(10) Patent No.: US 10,591,268 B2
(45) Date of Patent: Mar. 17, 2020

(54) FEELER FOR WORKPIECES BEING MACHINED

(71) Applicant: Balance Systems S.r.L., Milan (IT)

(72) Inventor: Gianni Trionfetti, Agrate Brianza (IT)

(73) Assignee: Balance Systems S.r.L., Milan (IT)

( * ) Notice: Subject to any disclaimer, the term of this patent is extended or adjusted under 35 U.S.C. 154(b) by 230 days.

(21) Appl. No.: 15/292,839

(22) Filed: Oct. 13, 2016

(65) Prior Publication Data

US 2017/0030697 A1 Feb. 2, 2017

Related U.S. Application Data

(63) Continuation of application No. 13/847,846, filed on Mar. 20, 2013, now abandoned.

(30) Foreign Application Priority Data

Mar. 22, 2012 (EP) ..................................... 12160797

(51) Int. Cl.
| | | |
|---|---|---|
| *G01B 3/22* | (2006.01) | |
| *B24B 49/04* | (2006.01) | |
| *G01B 7/12* | (2006.01) | |
| *G01B 7/00* | (2006.01) | |

(52) U.S. Cl.
CPC ............... *G01B 3/22* (2013.01); *B24B 49/045* (2013.01); *G01B 7/001* (2013.01); *G01B 7/12* (2013.01)

(58) Field of Classification Search
CPC .......... G01B 5/012; G01B 5/08; G01B 7/001; G01B 7/12; G01B 2210/40; G01B 2210/44; G01B 3/22; B24B 49/04; B24B 49/045; B24B 5/04; B23Q 17/20
See application file for complete search history.

(56) References Cited

U.S. PATENT DOCUMENTS

| | | | |
|---|---|---|---|
| 2,908,252 A | | 10/1959 | Schuman |
| 3,622,287 A | | 11/1971 | Kurimoto et al. |
| 3,962,792 A | * | 6/1976 | Stepanek ................. B26D 3/16 33/501.04 |
| 4,279,079 A | | 7/1981 | Gamberini et al. |
| 4,377,911 A | | 3/1983 | Iida et al. |
| 4,592,697 A | | 6/1986 | Tuda et al. |
| 4,807,400 A | | 2/1989 | Corallo et al. |
| 4,811,524 A | | 3/1989 | Corallo |

(Continued)

FOREIGN PATENT DOCUMENTS

| | | | |
|---|---|---|---|
| JP | 2001-91206 A | 4/2001 | |
| JP | 2001091206 A * | 4/2001 | ............... G01B 7/00 |

OTHER PUBLICATIONS

Machine translation of Saito, JP 2001-091206.*

(Continued)

*Primary Examiner* — Timothy V Eley
*Assistant Examiner* — Marcel T Dion
(74) *Attorney, Agent, or Firm* — Vorys, Sater, Seymour and Pease LLP; Anthony Venturino

(57) ABSTRACT

Provided is a feeler for workpieces being machined, including a rocking arm configured to feel the workpiece, a first sensor configured to measure the position of the rocking arm and at least one additional sensor operatively connected to the rocking arm and configured to detect external perturbations acting on the feeler.

13 Claims, 3 Drawing Sheets

(56) References Cited

U.S. PATENT DOCUMENTS

| | | | |
|---|---|---|---|
| 4,978,857 A * | 12/1990 | Juengel | B23Q 1/0009 250/551 |
| 5,054,205 A * | 10/1991 | Danielli | G01B 5/08 33/501.04 |
| 5,099,585 A * | 3/1992 | Liskow | G01B 5/08 33/555.1 |
| 5,146,690 A | 9/1992 | Breitmeier | |
| 5,357,684 A | 10/1994 | Lindner et al. | |
| 5,404,649 A * | 4/1995 | Hajdukiewicz | B23Q 5/58 33/503 |
| 6,098,452 A | 8/2000 | Enomoto | |
| 6,128,547 A | 10/2000 | Tomoeda et al. | |
| 6,159,074 A | 12/2000 | Kube et al. | |
| 6,256,898 B1 | 7/2001 | Trionfetti | |
| 6,295,866 B1 | 10/2001 | Yamamoto et al. | |
| 6,360,450 B1 | 3/2002 | Turner | |
| 6,546,642 B1 | 4/2003 | Dall'Aglio et al. | |
| 6,907,673 B2 | 6/2005 | Zanier et al. | |
| 8,141,263 B2 | 3/2012 | Huang | |
| 8,991,064 B2 | 3/2015 | Trionfetti | |
| 2004/0255703 A1 | 12/2004 | Takai | |
| 2006/0026853 A1 | 2/2006 | Trionfetti | |
| 2006/0042109 A1 | 3/2006 | Kanai et al. | |
| 2006/0145494 A1 | 7/2006 | Nihei et al. | |
| 2007/0033820 A1 | 2/2007 | Dall'Aglio | |
| 2008/0195353 A1 | 8/2008 | Igasaki et al. | |
| 2008/0299872 A1 | 12/2008 | Boselli et al. | |
| 2011/0178753 A1 | 7/2011 | York | |
| 2013/0255092 A1 | 10/2013 | Trionfetti | |

OTHER PUBLICATIONS

Liu et al., "Improvement of the fidelity of surface measurement by active damping control"; Meas. Sci. Technol., vol. 1, No. 12, pp. 1330-1340, (1993).

European Search Report issued for EP 12 16 0797, four pages, completed on Jul. 17, 2012.

Machine Translation of JP 2001-091206 to Saito et al., Japanese Patent Office, URL: <https://www.j-platpat.inpit.go.jp/h0101>, retrieved from the Internet Jul. 3, 2019.

* cited by examiner

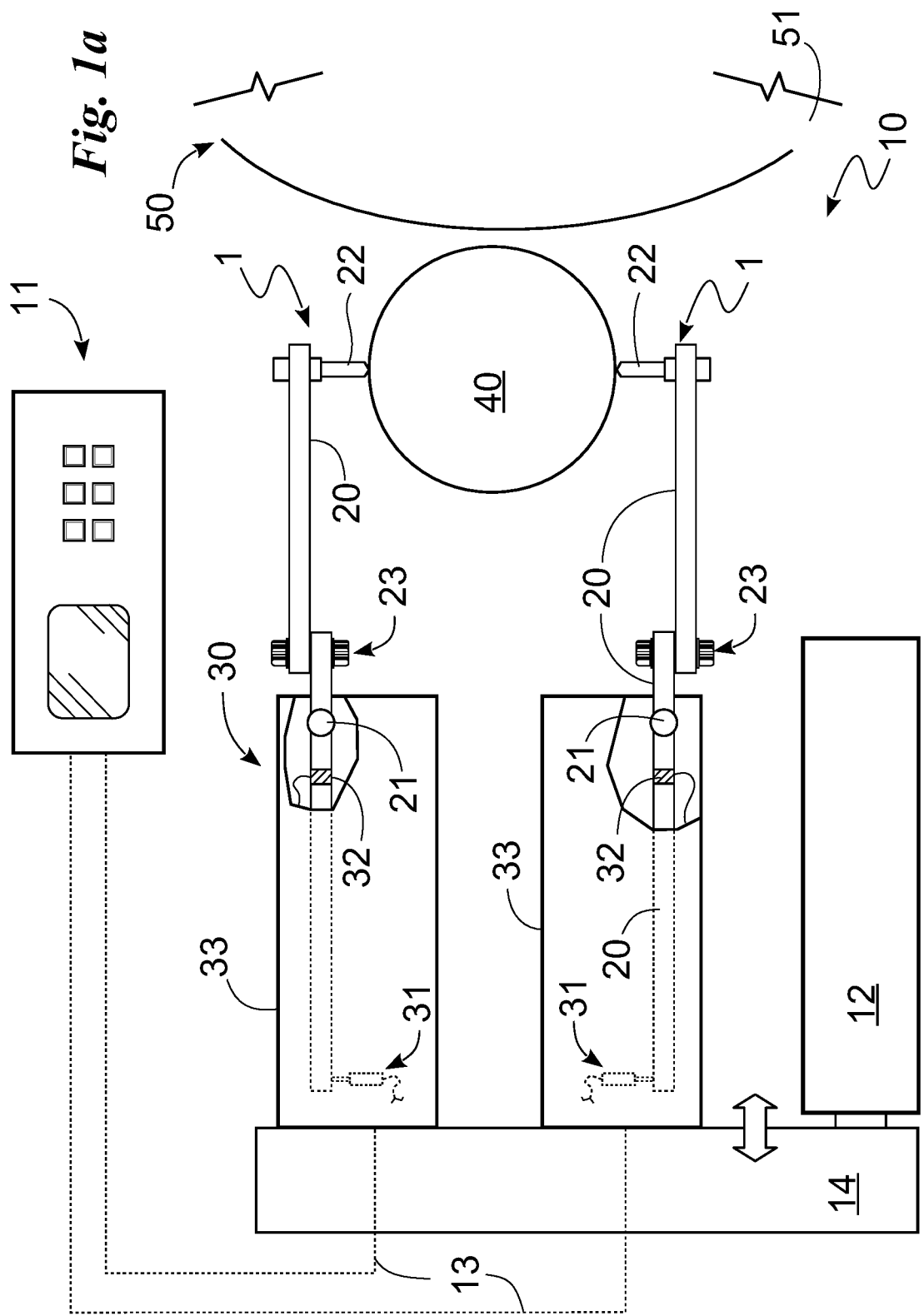

FEELER FOR WORKPIECES BEING MACHINED

FIELD OF THE INVENTION

The present invention relates to a feeler for workpieces being machined, comprising a rocking arm adapted to feel the workpiece and a first sensor adapted to measure the position of the rocking arm.

DESCRIPTION OF THE PRIOR ART

In particular, the invention relates to a tool for measuring and evaluating the quality of a machining operation by chip removal usable during machining, i.e. while the workpiece is positioned on the chip-removal machine and is machined thereby. In greater detail, the feeler being the object of the invention is adapted to be used for checking the diameters and circularity of a workpiece while it is being machined on a grinding machine.

It is known that presently, for checking the sizes and tolerance of a workpiece, in particular during grinding, an appropriate measuring device is used. This device comprises at least one feeler, contacting the surface of the workpiece and connected to a measuring apparatus. The latter, based on displacements of the feeler, detects sizes and signals them to the machine tool possibly operating intervention or stoppage thereof.

For instance, for measuring a diameter of a grinding shaft, the measuring device is provided with two feelers brought into contact with the workpiece at diametrically opposite sides. Otherwise, for measuring the axial position of a shoulder or the like for example, only one feeler is provided.

Each feeler at one end comprises an arm having a contact element adapted to feel the piece to be measured and a measuring head adapted to enable the arm displacements to be converted into suitable electric signals that can be analysed by the measuring apparatus.

The operator employing the measuring device for utilising and carrying out said size and tolerance controls acts as follows. First of all, he/she calibrates the feeler on the sizes of a certified sample. Subsequently, he/she moves the certified sample away from the feeler, disposes the feeler on the workpiece and starts machining, in particular grinding.

Then the feeler measures the size with the greatest accuracy and signals to the machine when the correct size has been reached, i.e. the size established during the planning step.

The above mentioned known art has some important drawbacks.

A first important problem is represented by the fact that sometimes the operator accidentally knocks against the feelers, after setting the reference size obtained from the sample so that in some cases the reference measure may be impaired. This drawback is further worsened by the fact that usually the operator becomes aware of the wrong measure only after many machining operations, which will give rise to many scraps or to the necessity to carry out new machining operations.

Another problem of these feelers resides in the high construction complexity of same bringing about high manufacturing costs.

Under this situation the technical task underlying the present invention is to conceive a feeler for workpieces being machined capable of substantially obviating the mentioned drawbacks.

Within the scope of this technical task it is an important aim of the invention to provide a feeler that does not bring about drawbacks even if it is subjected to accidental impacts.

It is a further aim of the invention to create a feeler of simple construction and reduced costs.

SUMMARY OF THE INVENTION

The technical task mentioned and the aims specified are achieved by a feeler for workpieces being machined, comprising a rocking arm adapted to feel the workpiece and a first sensor adapted to measure the position of the rocking arm, and at least one additional sensor operatively connected to the rocking arm and adapted to detect external perturbations acting on the feeler.

BRIEF DESCRIPTION OF THE DRAWINGS

The features and advantages of the invention are hereinafter clarified by the detailed description of a preferred embodiment of the invention, with reference to the accompanying drawings, in which:

FIG. 1a shows a measuring device including the feeler;

DESCRIPTION OF THE PREFERRED EMBODIMENTS

Figure 1B:
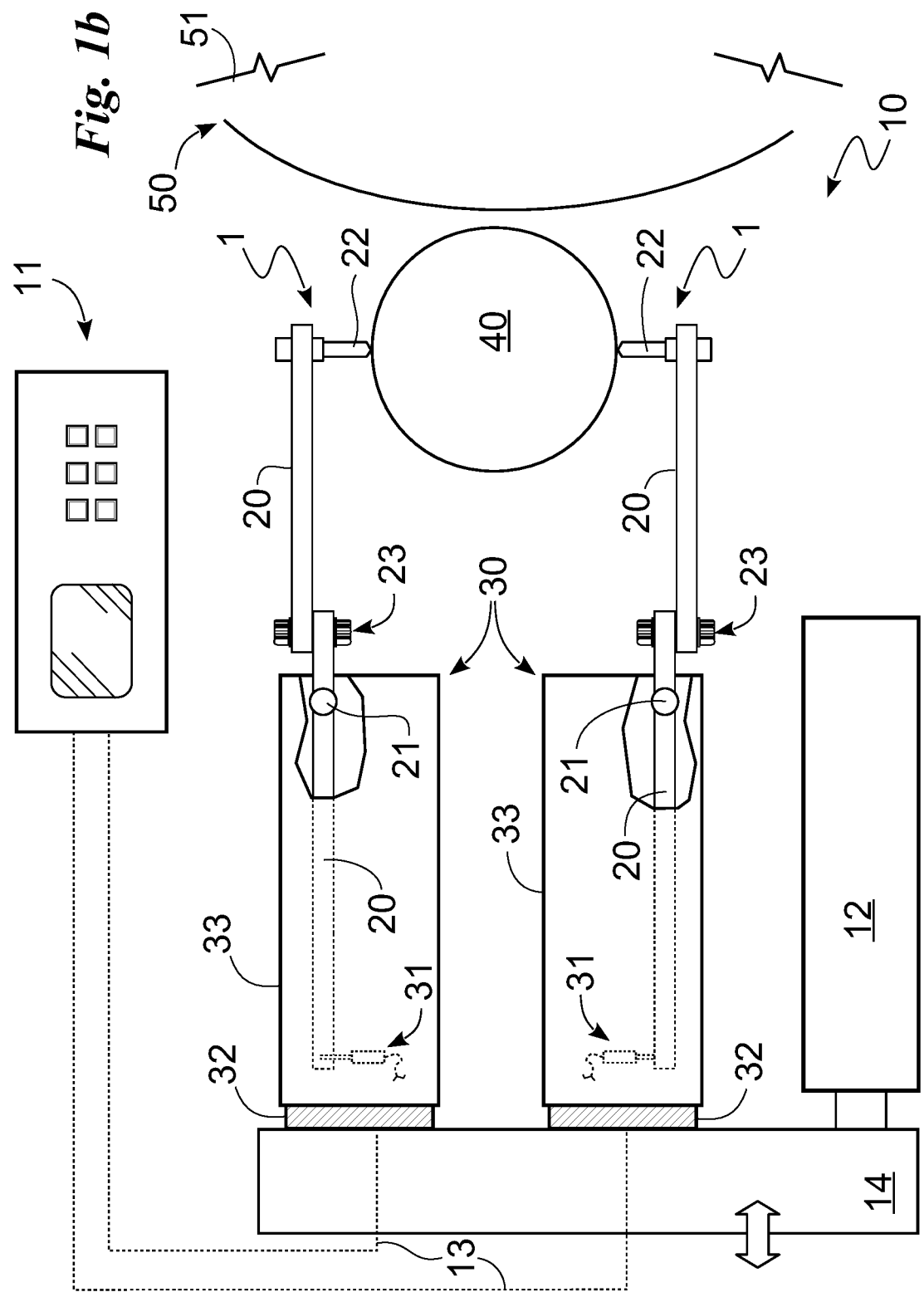
FIG. 1b represents a further example of use of the feeler according to the invention.

With reference to the mentioned figures, the feeler for workpieces being machined according to the invention is generally identified by reference numeral 1.

It is adapted to be used for measuring the quality of a machining operation by chip removal while the operation is being carried out. Feeler 1 is therefore adapted to be disposed close to a chip-removal machine tool 50, in particular a grinding machine, comprising a tool 51, such as a grinding wheel. Preferably, feeler 1 as hereinafter better described, is placed close to a grinding machine for measurement of the diameter of the workpiece 40. However this feeler can also be provided for other measurements such as axial measurements of a shoulder.

In particular, in case of measurement of the diameter of a workpiece 40 on a grinding machine, a measuring device 10 is used which comprises two feelers 1 and a measuring apparatus 11 electrically connected to the device 10 and in particular to feelers 1. The two feelers 1, in order to enable measurement of the diameter and circularity of the workpiece 40, are substantially placed on opposite sides relative to the workpiece 40 and, more specifically, are arranged in such a manner as to feel the workpiece 40 at substantially diametrically opposite points.

Device 10 further comprises a supporting structure 14 adapted to support said feelers 1 and an actuating system 12 adapted to move the device 10 in a direction away from or towards the workpiece 40, along suitable carriages not shown and external to device 10.

Feeler 1 substantially comprises two base components: a rocking arm 20 adapted to feel the workpiece 40, and a measuring head 30 adapted to carry out the necessary measurements on the workpiece 40 and brought into data connection with the measuring apparatus 11 through suitable cables 13.

The rocking arm 20 substantially consists of a rod, possibly comprising a detachable joint 23, oscillating around a hinge 21 rigidly connected to the measuring head 30. It has a first end suitably placed inside the measuring head 30 and a second end adapted to feel the workpiece 40. In particular, the second end of the rocking arm 20 comprises a contact element 22 adapted to be put into direct contact with the workpiece 40.

The contact element 22 consists of a pin the position of which is axially adjustable, and terminating with a ball, a cone or other similar element adapted to identify a contact surface between element 22 and workpiece 40 and preferably made of diamond or other material of high hardness.

The measuring head 30 conveniently comprises control means adapted to enable the positions of the rocking arms 20 to be evaluated and in connection with the measuring apparatus 11. In particular, this control means comprises a first sensor 31 adapted to produce a first measuring signal based on the position or displacement of the contact element 22 and at least one additional sensor 32 adapted to produce an additional measuring signal as a function of external perturbations acting on feeler 1 and in particular on arm 20. Therefore the general term "perturbations" is understood as indicating static or impulsive forces such as: an impact, force, pulse or acceleration from the outside and preferably having high speed or frequency, as compared with the movement speed of arms 20 while working.

The measuring head 30 further has a housing 33 adapted to receive at least the first sensor 31 inside it.

The first sensor 31 is suitable to detect the position of the rocking arm 20 in contact with the workpiece 40 during machining and therefore the machining state. In particular, the first sensor 31 is adapted to generate a first signal, of the electric type, directly proportional to the displacement, and consequently the position, of the contact element 22 relative to housing 33.

It consists for example of an inductive displacement transducer and, more specifically, of a known sensor of the LVDT (i.e. Linear Variable Differential Transformer) type or of a capacitive sensor. These sensors check the displacement, and consequently the position, of a ferromagnetic core, rigidly connected to the first end of the rocking arm 20 and perpendicular thereto, inside a cylindrical hollow housing comprising electromagnetic windings and integral with housing 33.

The additional sensor 32 is advantageously adapted to detect said impulsive perturbations. In particular, it consists of a piezoelectric element, a piezoresistive sensor, an accelerometer or any sensor adapted to detect these vibrations and forces acting from the outside.

This additional sensor 32 is further adapted to also detect, during machining, displacements of arm 20 due to surface defects and roughness or any other perturbation characterised by particularly reduced duration or high variation speeds.

Figure 2A:
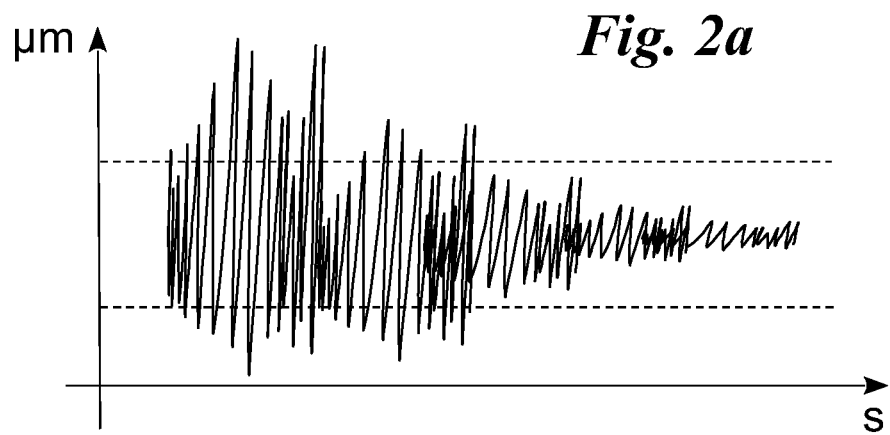
FIG. 2a shows the results of an analysis related to roughness of the workpiece carried out using the feeler of the invention.

The additional sensor 32 can be positioned at different locations. In particular, as shown in FIG. 2a, it can be positioned along the rocking arm 20.

Figure 2B:
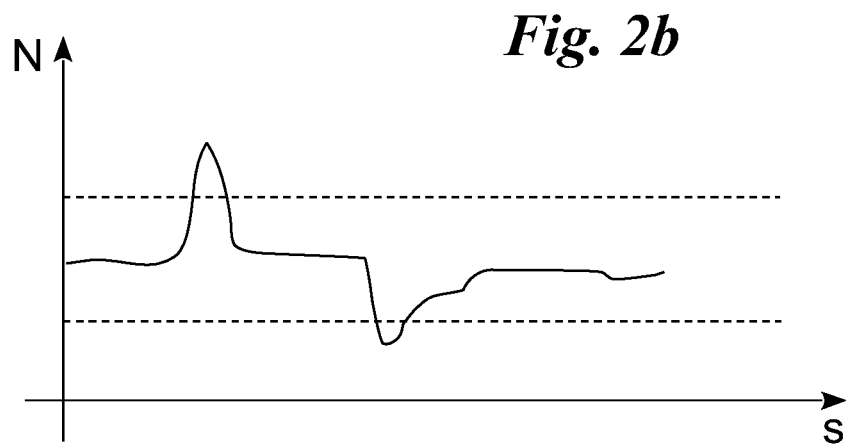
FIG. 2b shows the results of another analysis in connection with the presence of accidental forces and carried out using the feeler.

Alternatively, as shown in FIG. 2b, it is available externally of the measuring head 30, directly in contact with the head 30 itself and the supporting structure 14. In the last-mentioned case the additional sensor 32 is not directly in contact with arm 20 but, since hinge 21 only allows few movements, it succeeds in perceiving said perturbations just the same.

Finally feeler 1 can be provided with an actuating mechanism adapted to enable the rocking arm 20 to be moved so as to define a work position in which the rocking arm is substantially adjacent to the workpiece 40, and an open position in which the position of arm 20 relative to head 30 enables easy positioning or removal of the workpiece 40 from the machine 50.

The measuring device 10 comprising feeler 1 previously described as regards its structure is used according to the following process.

This process first contemplates a calibration step, in which the position of feelers 1 is calibrated as a function of the diameter or size to be carried out on a certified sample. If subsequently or during this step, feeler 1 is accidentally subjected to an unexpected impulsive perturbation, the latter is detected by the additional sensor 32, as hereinafter specified.

Subsequently, provision is made for a step of loading the workpiece, in which the workpiece 40 is positioned close to tool 51 and the two feelers 1 are moved, through the actuating system 12, and put close to the workpiece to be ground or machined, as shown in FIGS. 1a and 1b.

When the loading step has been completed, the step of machining the workpiece 40 begins and, simultaneously, measurement of the piece 40 occurs. In detail, during machining, the grinding machine or machine tool 50 removes chips from the workpiece 40. Each of the two arms 20, based on the shape of the surface of the workpiece 40, is moved and activates the first sensor 31 that will emit the measuring signal based on the position or displacement of the contact element 22. This first signal is transmitted through cables 13, to the measuring apparatus 11 that is therefore able to evaluate whether the machining operation is correct and has come to an end and possibly operates stopping of tool 51 or moves it away.

In addition, during this machining step, due to the particular sensitivity of the additional sensor 32 and therefore the particular values of the frequency response, feeler 1 detects the roughness or possible defects of the workpiece 40 and therefore evaluates the surface finish of the piece 40 itself.

In fact, the contact elements 22 being in contact with the workpiece surface follow the surface unevenness of the workpiece 40 and therefore generate oscillations on arm 20 that, due to the reduced sizes of the roughness and the rotation speed of the workpiece 40, are characterised by a particularly high frequency that therefore can be detected by the additional transducers 32. In particular, the additional sensors 32 create at least one additional signal highlighted in the graph in FIG. 2a and representing the surface roughness. Once the different measurements have reached the required values, the machining step has come to an end, feelers 1, through the actuating system 12, are moved to a distance from the workpiece 40 and the measuring process is completed.

If during the process, in particular immediately after the calibration step, feeler 1 and in particular arm 20 is accidentally subjected to an unexpected perturbation such as an impact, the additional sensor 32 perceives this perturbation and sends this information to apparatus 11 though the additional signal.

If the additional signal passes an acceptability threshold, apparatus 11 signals this drawback to the user. Then an intervention step is activated in which an evaluation is carried out on the state of at least one of feelers 1 present on device 10. In particular, this intervention step takes place when the additional transducer 32, based on motion of the rocking arm 20, produces an additional signal of width beyond a predetermined acceptability threshold, as shown in FIG. 2b.

These external perturbations, that are suitably detected by the additional sensors 32 even when device 10 is inactive, are transmitted to the measuring apparatus 11 that will signal the presence of said impulsive perturbations to the operator, possibly when device 10 or apparatus 11 are started.

In particular, the measuring apparatus graphically reproduces these impulsive perturbations (FIG. 2) enabling the operator to evaluate them.

If the width of this signal is beyond the predetermined values and therefore beyond the acceptability threshold, the intervention step is carried out in which the operator makes an evaluation of the calibration step of feeler 1 and possibly carries out this step again.

The invention achieves important advantages.

A first advantage is represented by the fact that feeler 1 for workpieces 40 being machined enables possible problems resulting from an impact to be highlighted in a simple and quick manner.

In fact, feeler 1, due to the presence of the additional sensor 32, is able to identify such an impact and evaluate the amount thereof and is therefore in a position to enable the operator to establish whether this impact may have caused modifications in the original calibration, positioning errors and even breaks of the rocking arm 20.

In particular, this evaluation is made possible due to the acceptability threshold that makes it possible to understand whether the impact is strong enough to cause arising of said problems.

Another advantage connected with the presence of the additional sensor 32 is represented by the possibility of measuring the relative roughness and surface finishing of the workpiece 40.

A further advantage resides in that the additional sensor 32, externally connected to heads 30 (FIG. 1b), is usable and applicable to known and commercially available feelers too, without complicated or difficult modifications to the feelers themselves being required.

Finally, feeler 1 is simple and cheap.

The invention is susceptible of variations falling within the inventive idea described in the independent claims. In particular, feeler 1 can be interlocked with a control apparatus and not with a grinding wheel. In addition the two transducers 31 and 32 can consist of a single sensor adapted to detect both types of vibration.

The invention claimed is:

1. A process for detecting accidentally unexpected accidental perturbation acting on a feeler of a workpiece measuring device, said workpiece measuring device comprising:
at least one feeler for the workpiece, each said at least one feeler comprising a rocking arm and a measuring head, wherein said rocking arm comprises a rod connected to the measuring head and comprises an adjustable contact pin element adapted to feel said workpiece, and
wherein said measuring head is adapted to carry out measurements on the workpiece and comprises a first sensor adapted to measure the position of said rocking arm and adapted to produce a first measuring signal based on the position or displacement of the contact element, and at least one additional sensor, being a piezoelectric sensor, operatively positioned separate from the contact element, adapted to produce an additional measuring signal as a function of external perturbation acting on the feeler,
a measuring apparatus in data connection with the feelers for receiving and analyzing the first measuring signal and the additional measuring signal for detecting sizes based on displacements of the feeler,
said process comprising:
calibrating position of said feeler as a function of the size by contacting said feeler with a certified sample, removing the certified sample from contact with the feeler;
after said calibration, said additional sensor detects said unexpected accidental external perturbations consisting of unexpected accidental impulsive forces acting on said at least one feeler when the workpiece is not loaded on the measuring device, and the additional sensor perceives the unexpected accidental external perturbations and reports the unexpected accidental external perturbations by sending the additional signal to the measuring apparatus.

2. The process as claimed in claim 1, wherein said first sensor is a sensor of the LVDT type.

3. The process as claimed in claim 1, wherein said additional sensor is positioned along said rocking arm.

4. The process as claimed in claim 1, wherein said workpiece measuring device further comprises a supporting structure to which said at least one feeler is secured.

5. The process as claimed in claim 4, wherein said additional sensor is positioned between said rocking arm and said supporting structure.

6. The process as claimed in claim 5, wherein the workpiece measuring device comprises two or more of the at least one feelers that are mutually opposite and are adapted to measure a diameter of the workpiece.

7. The process as claimed in claim 4, wherein said measuring device is included in a chip-removal machine tool.

8. The process as claimed in claim 7, wherein said additional sensor is positioned between said rocking arm and said supporting structure.

9. The process as claimed in claim 7, wherein said chip-removal machine tool consists of a grinding wheel.

10. The process device as claimed in claim 4, wherein said additional sensor is positioned between said measuring head and said supportive structure.

11. The process as claimed in claim 1, wherein during machining said additional sensor detects displacements of said rocking arm due to surface defects and roughness.

12. The process as claimed in claim 1, wherein during machining said additional sensor detects any other unexpected accidental external perturbations consisting of unexpected accidental impulsive forces acting on said at least one feeler, and the additional sensor reports the unexpected accidental external perturbations detected during machining by sending the additional measuring signal to the measuring apparatus.

13. The process as claimed in claim 1, wherein during machining said additional sensor detects displacements of said rocking arm due to surface defects and roughness, and any other unexpected accidental external perturbations consisting of unexpected accidental impulsive forces acting on said at least one feeler, and the additional sensor reports the unexpected accidental external perturbations detected during machining by sending the additional measuring signal to the measuring apparatus.

* * * * *